March 27, 1934.   T. F. BIRMINGHAM   1,952,620
METHOD FOR PREPARING PIPE ENDS
Filed May 11, 1933   2 Sheets-Sheet 1
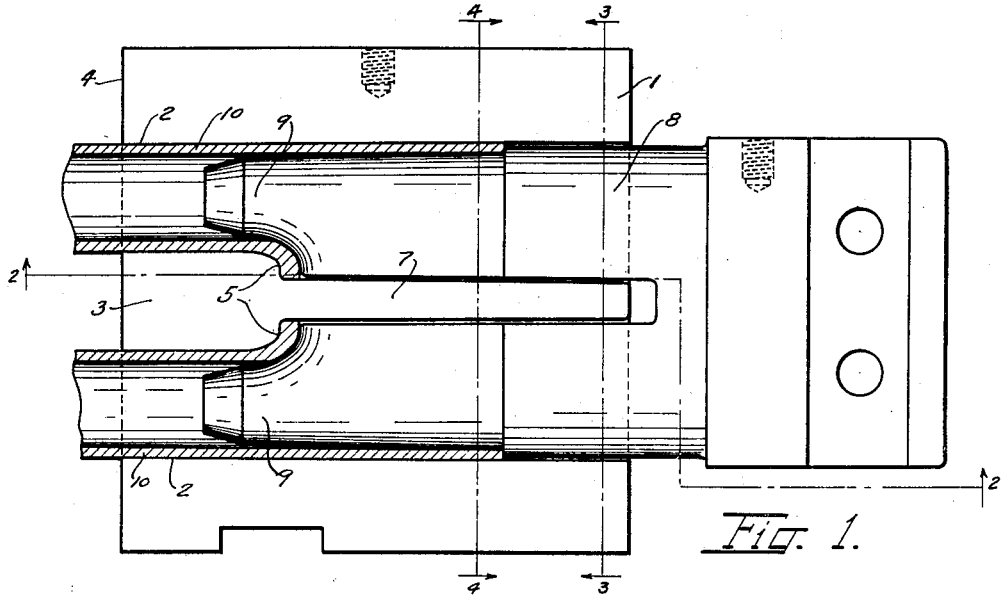
Fig. 1.
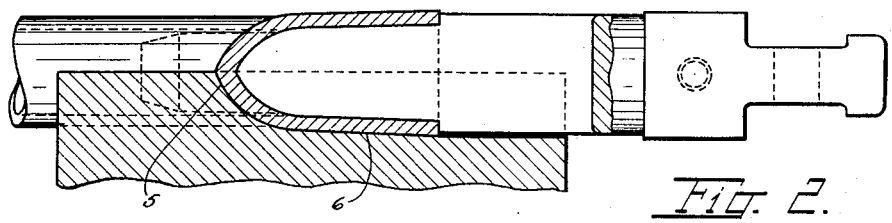
Fig. 2.
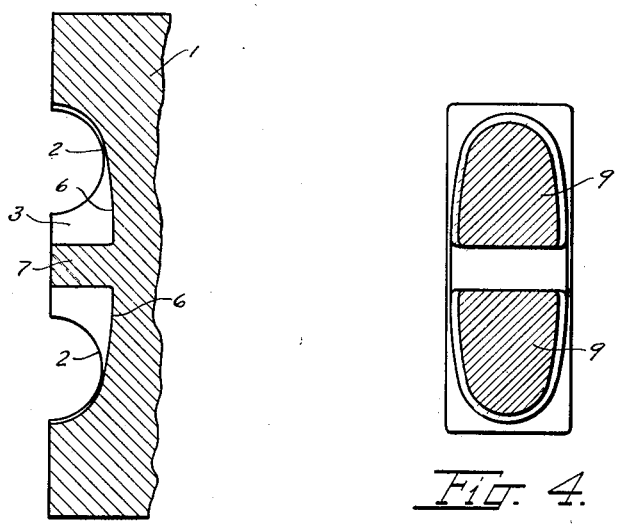
Fig. 3.
Fig. 4.
INVENTOR
THOMAS F. BIRMINGHAM
BY O. V. Thice
ATTORNEY March 27, 1934.  T. F. BIRMINGHAM  1,952,620
METHOD FOR PREPARING PIPE ENDS
Filed May 11, 1933  2 Sheets-Sheet 2

INVENTOR
THOMAS F. BIRMINGHAM
BY O. V. Thien
ATTORNEY

Patented Mar. 27, 1934

1,952,620

UNITED STATES PATENT OFFICE 1,952,620

METHOD FOR PREPARING PIPE ENDS

Thomas F. Birmingham, Hammond, Ind., assignor to The Superheater Company, New York, N. Y.

Application May 11, 1933, Serial No. 670,422

4 Claims. (Cl. 29—157.6)

The present invention relates to the art of making return bends and particularly to that method of making such structures in which the return bend is shaped directly on the ends of the two pipes to be connected and is made of the material of the pipes themselves. The invention is applicable when the pipes are separately shaped into a form adapted for connection to each other and are then welded to each other, for example by an electric flash method.

The present method for preparing pipes for the operation of connecting them is somewhat related to the one described and claimed in United States application 531,151, filed by C. A. Brandt on April 18, 1931. The method forming the subject matter of said application is a rather special one but has in common with the present one the fact that the pipes are separately operated on and formed, the mechanism used also being somewhat similar.

In both instances the pipes are suitably heated and then split along a line parallel to the axis for a suitable distance inward from the end, and the portions adjacent to the slit are bent outwardly until they become approximately tangent to the cylindrical surface of the pipe. A pair of pipes so prepared is then welded together along the edges of the pieces that have been bent outwardly, subsequently to which the structure is closed at the end by any suitable means.

If the structure is to be used not as a return bend but as a bifurcated pipe structure, the end is not entirely closed down but is simply brought down to a circular shape and a third pipe length welded to the open end.

In the said application the edges of the bent-out portions of one pipe are allowed to abut directly against those of the bent-out portions of the other pipe so that the edges receive complementary, although irregular, shapes which mesh closely and are subsequently welded together. In the present invention the edges are all made smooth by having them abut against smooth walls so that these edges match without further preparation.

Figure 5:
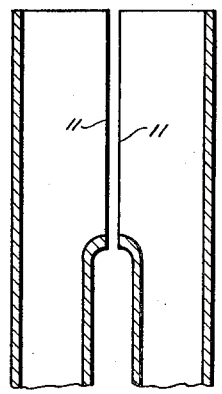
Figure 6:
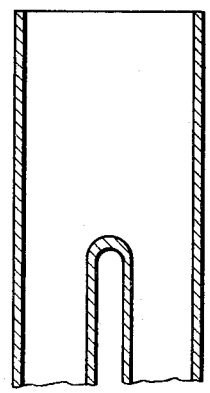
Figure 7:
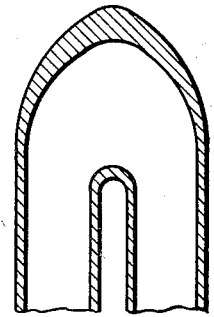
Figure 8:
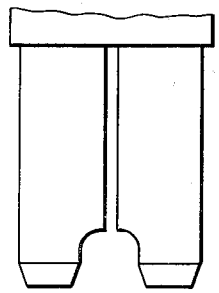
Figure 9:
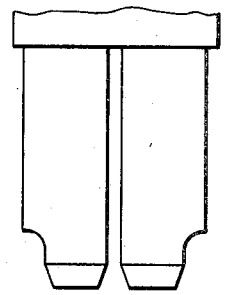
Figure 10:
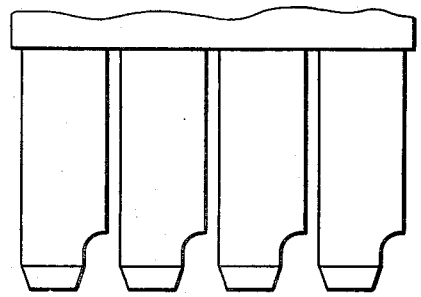
Figure 12:
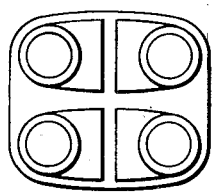
Figure 11:
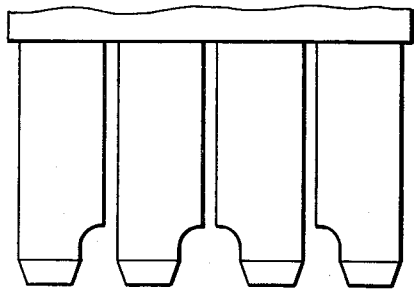
Figure 13:
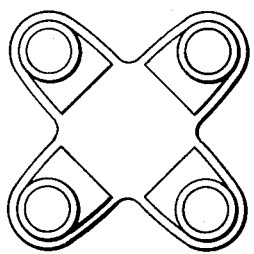

The invention is illustrated in the drawings filed with the present specification. In these drawings Fig. 1 shows the male die or plunger and one half of the female die which are used in carrying my invention into practice, the two being shown in the position they occupy after the plunger has performed its stroke, the pipes operated on also being shown in position in section. Figs. 2, 3 and 4 are respectively sectional views on lines 2—2, 3—3, and 4—4 of Fig. 1. Fig. 5 shows in longitudinal section two pipe ends shaped by the operation and ready for connection. Fig. 6 shows them connected and Fig. 7 shows a completed return bend. Fig. 8 shows the plunger of Fig. 1. Figs. 9, 10 and 11 show plungers of modified forms and Figs. 12 and 13 show end views of still further modifications. Figs. 8 to 13 are more or less diagrammatic.

The half die 1 has two semi-circular grooves 2—2 separated by a wall 3. These grooves extend inwardly from the end 4 of the die for a certain distance and at the point 5 merge on the inner side into the flattened areas 6—6. These flattened areas extend to the opposite end of the die 1. They are limited on the sides facing each other by the wall 7 which forms a continuation of the wall 3 but is correspondingly narrower.

The other half of the die (not illustrated) is symmetrical with the one described and when the two are placed into the position they occupy during the operation there are formed in the assembled die two openings extending from end to end. These openings are circular at the one end and have a generally U-shaped cross-section at the other end.

The plunger 8 is generally complementary to the interior of the complete die 1 described, but is somewhat smaller and spaced from the wall except on the side facing the wall 7 where it is substantially in contact with the wall. The fingers 9—9 are circular in cross-section near their tips and substantially U-form in cross-section nearer their roots, the latter shape being shown clearly in Fig. 4.

The operation of such a die is as follows: The pipes are clamped in parallel relation, with their ends alined. They are then suitably heated and placed in one half of the female die, the other half then being put into place by suitable mechanism. The plunger 8 then performs its stroke during which the pipes will be split each along a line parallel to its axis and the two portions adjacent to the slit in each bent outwardly. The dimensions of the dies are such that the edges of the split portions come into forcible contact with the face of the wall 7. This is done in order to leave the edges smooth, these edges being left ragged by the splitting operation. In processes of this general type as heretofore practiced the edges were made smooth by steps slower and more expensive than those herein disclosed. Thus, in one prior process the pipe was first sawed along a line parallel to the axis for a suitable distance and the portions adjacent to the sawed slit were then bent outward. My process eliminates the necessity of this sawing operation which is an important saving. If the edges were not made smooth by sawing the slit, they had in prior processes to be machined to make them smooth, which also involved an extra operation and expense. The advantage of my process is that in a single operation the pipes are shaped perfectly for the subsequent welding together. They come out from the operation described in the form illustrated in Fig. 5, the edges 11—11 being smooth and ready for welding. This welding is done preferably by a flash method, but can be done by other means if desired.

The resulting structure is shown in cross-section in Fig. 6.

If intended for a return bend, the structure is next closed by known methods into the form shown in Fig. 7. As mentioned above, the structure may be used for forming a bifurcated tubular element in which case instead of entirely closing the end the swaging down is stopped after the end has been given a circular shape of the proper size and the necessary connecting pipe is welded to such circular end.

It is obviously unnecessary to form the two pipes in a single operation in a double die such as illustrated. The two might be formed separately, the dies comprising only half of what has been described, i. e. only enough to operate on a single pipe. One advantage of pairing the dies as described is that any lateral thrust occasioned by the splitting of the pipes and bending them outwardly is balanced out. In addition of course time is saved by performing the double operation instead of performing the two operations separately.

In Figs. 8 to 19 there is illustrated the fact that the grouping of the dies may be other than that described. Fig. 8 is meant to illustrate more or less diagrammatically the position of the two fingers of the plunger in the form just described. The fingers might be reversed so that the pipes are split on the outer sides and the portions adjacent to the slits are bent outwardly. The necessary form for the plunger is illustrated in Fig. 9. It is thought unnecessary to show what form the female die must take, as this will be obvious.

It is quite possible to perform the operation on more than two pipes simultaneously. Fig. 10 for example shows a gang of four plungers with which four pipes could be operated in a single stroke. The shape of the female die will again be obvious and need not be illustrated. In this figure the fingers all face the same way and they are shown thus to illustrate this possibility which of course is also present when there are only two fingers. Fig. 10 illustrates a four-fingered plunger with the fingers symmetrically arranged, two of them facing toward the left and two toward the right, the advantage again being the balancing out of any side thrusts.

This can evidently be carried further if desired, any number of fingers being used, the female die being shaped to correspond. In all cases the female die is of course made in two symmetrical halves as will be obvious from the description given in connection with the principal form.

Instead of placing the fingers all in one line as in Figs. 10 and 11, they may be grouped as in Fig. 12, one pair above the other, or they might be grouped as in Fig. 13, all facing toward a common center. These variations are spoken of to illustrate that there is considerable latitude in practicing my invention without losing its essence.

What I claim is:

1. In the art of making return bends and related structures the process which comprises the steps of heating a pipe adjacent to its end to forging temperature, splitting it inwardly from the end for a distance on a line generally parallel to its axis, bending outward into parallel tangent positions the portions adjacent on each side to the slit, and abutting the edges of the bent out portions forcibly against a wall so as to force all parts of said edges into a common plane.

2. In the art of making return bends and related structures the process which comprises the steps of heating a pipe adjacent to its end to forging temperature, splitting it inwardly from the end for a distance on a line generally parallel to its axis by exerting axial and internal pressure, simultaneously with the splitting bending outward into parallel tangent positions the portions adjacent on each side to the slit, and simultaneously with the splitting and bending outward causing the edges of the bent-out portions to abut forcibly against a wall thereby forcing all portions of said edges into a common plane.

3. In the art of making return bends and related structures, the process of simultaneously performing on each of a plurality of pipes the steps recited in claim 2.

4. In the art of making return bends and related structures, the process of simultaneously performing on each two pipes the steps recited in claim 2.

THOMAS F. BIRMINGHAM.